United States Patent
Nakayama (10) Patent No.: US 12,473,524 B2
(45) Date of Patent: Nov. 18, 2025

(54) METHOD FOR MANUFACTURING LUMINAL STRUCTURE

(71) Applicant: SAGA UNIVERSITY, Saga (JP)

(72) Inventor: Koichi Nakayama, Saga (JP)

(73) Assignee: SAGA UNIVERSITY, Saga (JP)

( * ) Notice: Subject to any disclaimer, the term of this patent is extended or adjusted under 35 U.S.C. 154(b) by 953 days.

(21) Appl. No.: 17/439,277

(22) PCT Filed: Mar. 13, 2020

(86) PCT No.: PCT/JP2020/012567
§ 371 (c)(1),
(2) Date: Sep. 14, 2021

(87) PCT Pub. No.: WO2020/189792
PCT Pub. Date: Sep. 24, 2020

(65) Prior Publication Data
US 2022/0154123 A1    May 19, 2022

(30) Foreign Application Priority Data
Mar. 15, 2019   (JP) ................................. 2019-048229

(51) Int. Cl.
| | |
|---|---|
| A61K 35/00 | (2006.01) |
| A61P 19/02 | (2006.01) |
| C12M 1/12 | (2006.01) |
| C12N 5/00 | (2006.01) |
| C12N 5/071 | (2010.01) |

(52) U.S. Cl.
CPC ........... C12M 25/00 (2013.01); C12N 5/0068 (2013.01)

(58) Field of Classification Search
None
See application file for complete search history.

(56) References Cited

U.S. PATENT DOCUMENTS

| | | | |
|---|---|---|---|
| 2011/0200559 A1* | 8/2011 | Koga | .................. C12N 5/0062 435/395 |
| 2014/0120192 A1 | 5/2014 | Nakayama et al. | |
| 2016/0348066 A1 | 12/2016 | Kuchiishi et al. | |
| 2019/0359929 A1* | 11/2019 | Kishii | ..................... C12M 3/00 |

FOREIGN PATENT DOCUMENTS

| | | |
|---|---|---|
| EP | 2 725 091 A1 | 4/2014 |
| EP | 3 091 067 A1 | 11/2016 |
| JP | 4517125 B2 | 8/2010 |
| JP | 2016144430 A * | 8/2016 |
| JP | 2017-79719 A | 5/2017 |
| JP | 6334837 B1 | 5/2018 |

OTHER PUBLICATIONS

Extended European Search Report for European Application No. 20773527.5 dated Nov. 14, 2022.
Arai et al., "Fabrication of scaffold-free tubular cardiac constructs using a Bio-3D printer," PLoS ONE, vol. 13, No. 12: e0209162, 17 pages (2018).
International Search Report mailed Jun. 9, 2020, in PCT/JP2020/012567.

* cited by examiner

*Primary Examiner* — Nghi V Nguyen
(74) *Attorney, Agent, or Firm* — Birch, Stewart, Kolasch & Birch, LLP (57) ABSTRACT

A jig member for use in the manufacture of a luminal cell structure, in which needle-shaped bodies are arranged in a comb-like form on a thickness-direction surface of a plate-like support having a length direction, wherein a surface which is adjacent to the thickness-direction surface and is along the length direction is formed in a tapered shape toward tips of the needle-shaped bodies; and a jig for use in the manufacture of a luminal cell structure, in which the member is arranged on a circumference of a circle with the tips of the needle-shaped bodies facing in the direction toward the center of the circle.

5 Claims, 14 Drawing Sheets

METHOD FOR MANUFACTURING LUMINAL STRUCTURE

TECHNICAL FIELD

The present invention relates to a method for fabricating a luminal cell structure using a pinholder-shaped (Kenzan-like) member in which needle-shaped bodies are arranged like a comb.

BACKGROUND ART

According to a conventionally known technique, a three-dimensional cell structure is fabricated by temporarily fixing cell masses (spheroids) to a Kenzan-like needle array (Patent document 1). This technique is characteristic in that three-dimensional formation can be realized by using cells only and also in that it is capable of constructing a luminal structure such as a blood vessel.

In order to fabricate a long and narrow luminal structure like a blood vessel, it is necessary to prepare a Kenzan having needles with a length of said structure of interest and to stack spheroids on the needles.

Since, however, the needles used are extremely fine, it is difficult to manufacture a self-standing Kenzan-like member if the needles are too long.

Meanwhile, a plurality of luminal structures each having a length within the length of the needles of the Kenzan can be fabricated and then cultured while their edges make contact with each other so that these luminal structures are connected, thereby obtaining a long luminal structure.

According to this method, however, joints may possibly remain and skills of the operator are required and therefore problems remain in terms of reproducibility and mass productivity.

PRIOR ART DOCUMENTS

Patent Document

Patent document 1: Japanese Patent No. 4517125

SUMMARY OF INVENTION

Problem to be Solved by Invention

Thus, a method for easily fabricating a long jointless tubular structure without requiring skills of the operator has been desired.

In order to solve the above-described problems, the present inventor conducted intensive studies, and as a result of which succeeded in fabricating a luminal structure of interest by providing spheroids on comb-like Kenzan-like members and aligning these Kenzan-like members in a circular arc, thereby accomplishing the present invention.

Means for Solving Problem

Thus, the present invention is as follows.

(1) A jig member for fabricating a luminal cell structure, the member comprising comb-like arranged needle-shaped bodies on a surface in the thickness direction of a plate-like support having a longitudinal direction, wherein the surfaces extending in the longitudinal direction abutting the surface in the thickness direction are tapered towards the tips of the needle-shaped bodies.

(2) The member according to (1), wherein the support has areas at both ends protruding in the length direction of the needle-shaped bodies.

(3) The member according to (1) or (2), which is modularized into a plurality of components.

(4) A jig for fabricating a luminal cell structure, wherein the members according to any one of (1)-(3) are aligned in a circular arc such that their surfaces extending in the longitudinal direction face each other and the tips of the needle-shaped bodies point towards the center of the circle.

(5) The jig according to (4), wherein the alignment is conducted using a holder for holding the member according to any one of (1)-(3).

(6) A method for fabricating a luminal cell structure, the method comprising:
disposing spheroids on the tip areas of the needle-shaped bodies of the member according to any one of (1)-(3);
aligning the members having the spheroids disposed thereon in a circular arc such that their surfaces extending in the longitudinal direction face each other and the tips of the needle-shaped bodies point towards the center of the circle; and
culturing the spheroids.

Effect of the Invention

The present invention is capable of easily fabricating a long and narrow tubular cell structure.

MODES FOR CARRYING OUT INVENTION

The present invention relates to a jig member for fabricating a luminal cell structure, the member comprising comb-like arranged needle-shaped bodies on a surface in the thickness direction of a plate-like support having a longitudinal direction, wherein the surfaces extending in the longitudinal direction abutting the surface in the thickness direction are tapered towards the tips of the needle-shaped bodies.

Figure 1:
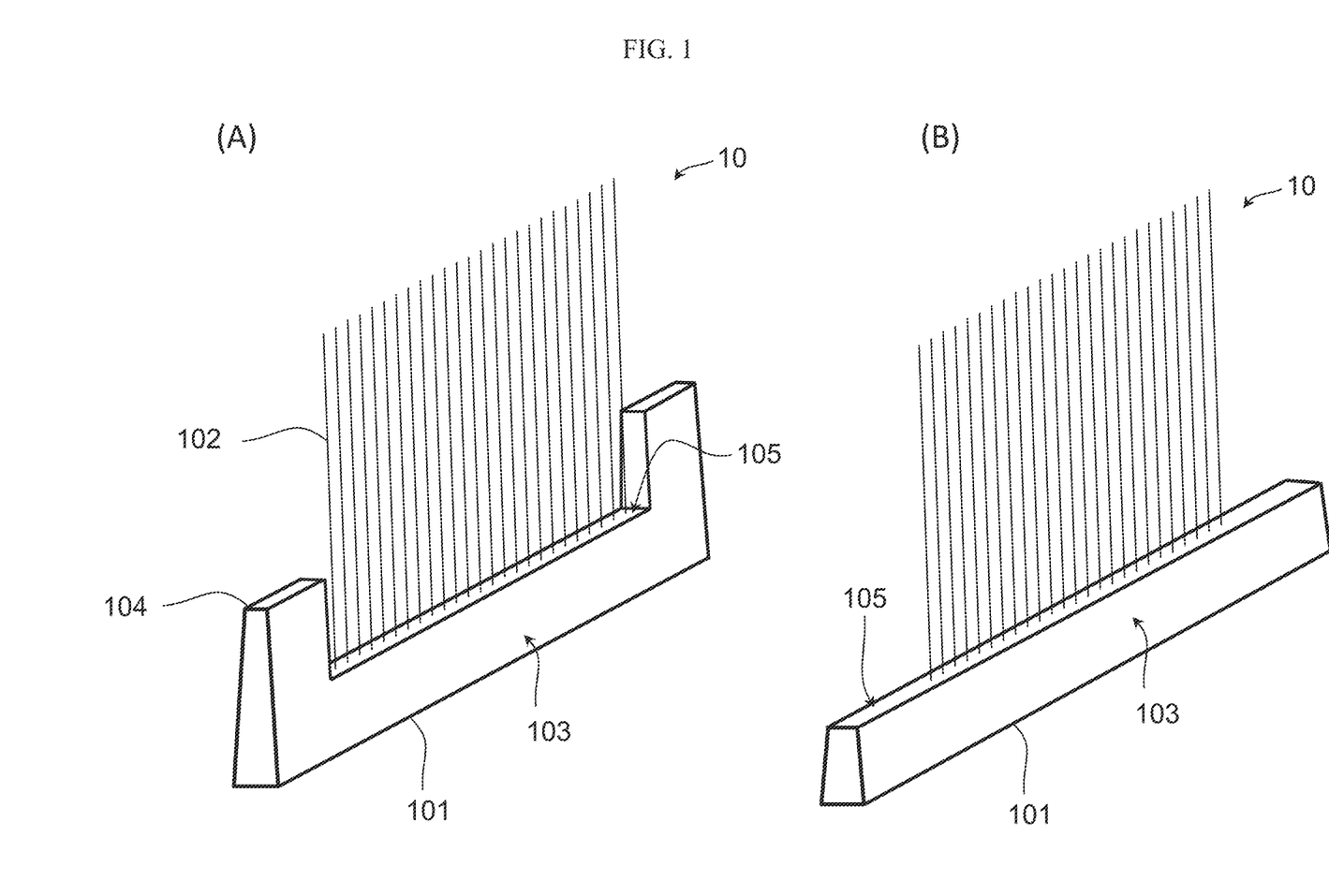
FIG. 1 is a view showing a jig member for fabricating a luminal cell structure.

FIG. 1 shows perspective view of jig members 10 for fabricating a luminal cell structure of the present invention.

In FIG. 1, each of the jig members 10 for fabricating a luminal cell structure (hereinafter, referred to as a "member 10") has comb-like arranged needle-shaped bodies 102 on a surface in the thickness direction of a plate-like support having a longitudinal direction. Furthermore, surfaces 103 extending in the longitudinal direction abutting the surface 105 in the thickness direction of the member are formed to taper towards the tips of the needle-shaped bodies 102.

Moreover, according to the present invention, a "luminal cell structure" refers to a hollow and generally columnar cell-based tissue (a straw or macaroni-shaped tissue) which is formed by allowing cell masses (spheroids), i.e., cell aggregates, to fuse with each other. Such a "luminal cell structure" is not particularly limited as long as it has a cavity, and can be used, for example, as a hollow organ such as a blood vessel, a digestive tract, a trachea, a peripheral nerve, a ureter or a urethra.

According to the present invention, parts of the support 101 at both ends are referred to as end parts 104 where the needle-shaped bodies 102 are not provided, and they provide areas for a jig holder (which will be described later) to hold the member. The end parts 104 may have protruding shapes that protrude in the length direction of the needle-shaped bodies 102 (FIG. 1A), or may not have such protruding areas (FIG. 1B).

Moreover, a stainless steel-, polypropylene- or nylon-based material or the like can be used as the material of the needle-shaped bodies 102, although the material is not limited thereto.

Figure 2:
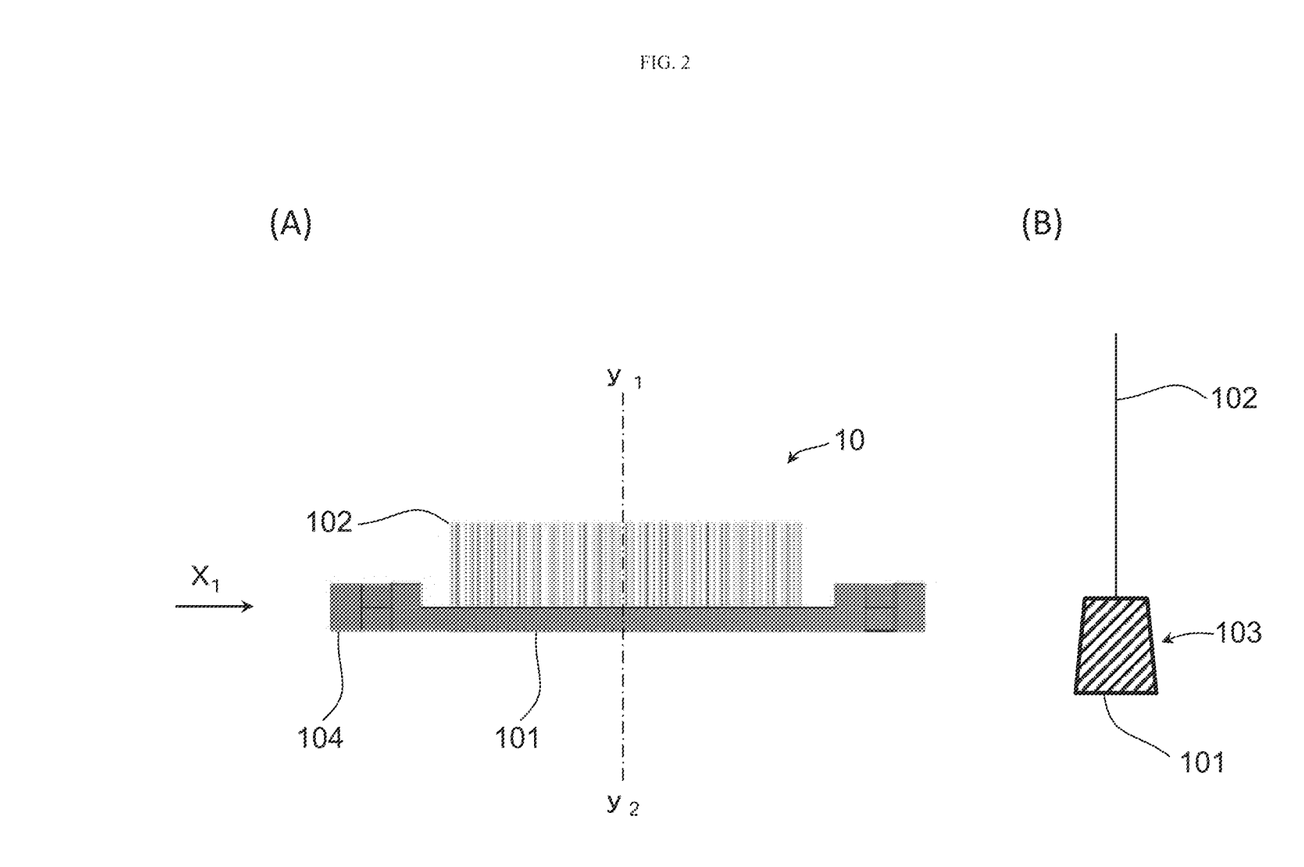
FIG. 2 is a view showing a jig member for fabricating a luminal cell structure.

FIG. 2 shows (A) a front view of the member 10 of the present invention and (B) a cross-sectional view cut across line $y_1$-$y_2$ and seen from the side of the member 10 ($X_1$ direction).

As shown in FIG. 2B, the surfaces 103 extending in the longitudinal direction are formed to taper toward the tips of the needle-shaped bodies 102.

According to the present invention, the taper angle of the tapered shape of the member 10 is not particularly limited.

Figure 3:
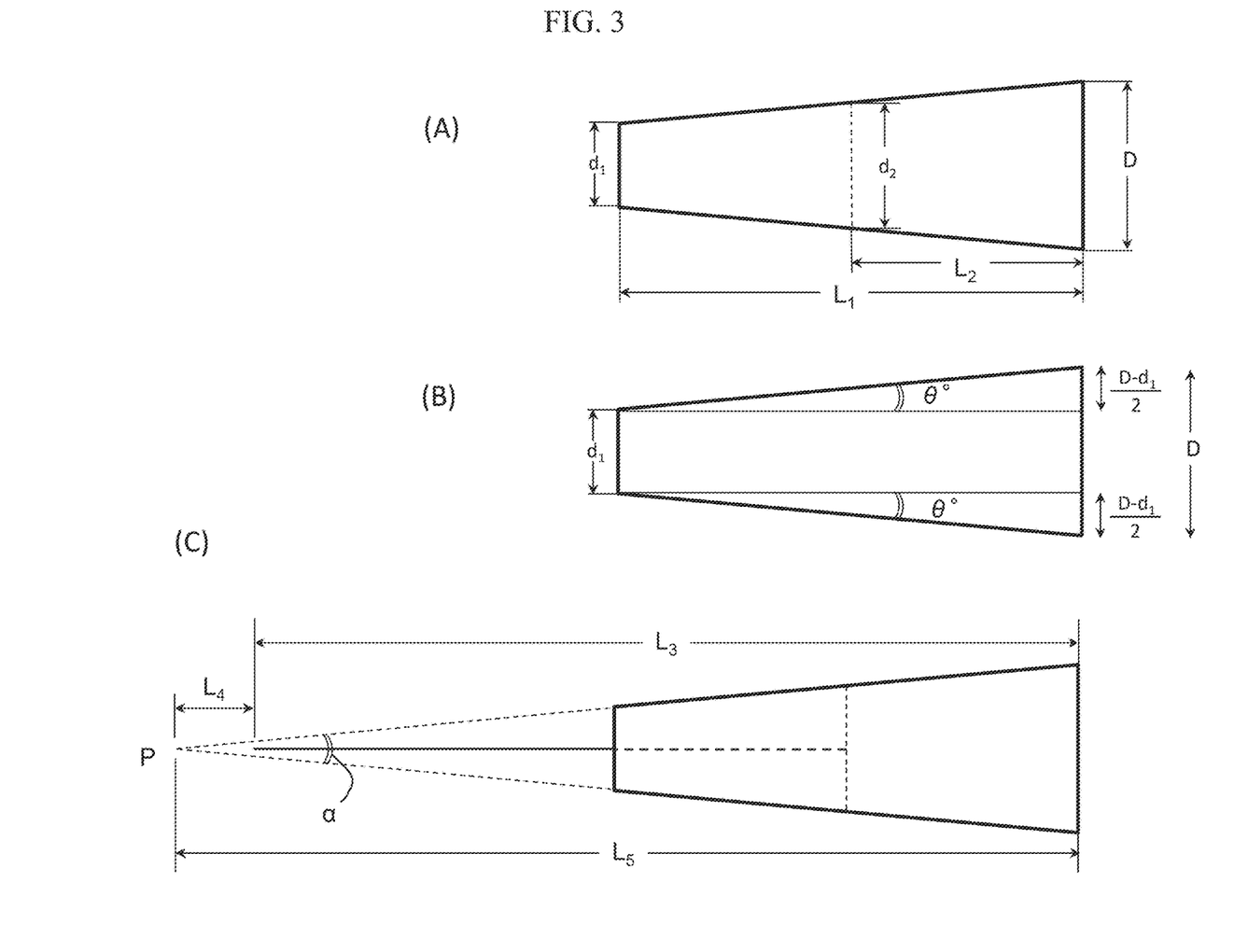
FIG. 3 is a view showing a taper angle of a jig member of the present invention.

FIG. 3 shows schematic views for illustrating a taper angle of the tapered shape of the member 10.

In FIG. 3A, provided that the width of the bottom surface of the support 10 is D, the width of the upper surface is $d_2$ and the width of the protruding areas of the end parts 104 is $d_1$, the taper ratio can be expressed as $(D-d_1)/L_1$ or $(D-d_2)/L_2$.

$(D-d_1)/L_1$ represents the taper ratio with respect to the shape of the protruding areas of the end parts 104 shown in FIG. 1 or 2 seen from the side of the member 10 ($X_1$ direction shown in FIG. 2) whereas $(D-d_2)/L_2$ represents the taper ratio with respect to the shape of the support 101 cut in the $y_1$-$y_2$ direction and seen from the side of the member 10 ($X_1$ direction) (FIG. 2B).

Since gradient θ in FIG. 3B can be expressed by the following equation:

Tan θ°=$((D-d_1)/2)/L_1$, the gradient is:

$$\text{Tan}\theta = \frac{D - d_1}{2L_1}$$

$$\theta = \tan^{-1}\left(\frac{D - d_1}{2L_1}\right)$$

(like equations also apply to the case of $L_2$ and $d_2$).

Accordingly, if the taper angle of the present invention is α, then α=2θ.

The taper angle α can suitably be determined according to the dimensions of the members 10 and the length of the needle-shaped bodies 102.

In FIG. 3C, $L_3$ represents the distance from the bottom of the member 10 to the tips of the needle-shaped bodies 102, $L_4$ represents the distance from the tips of the needle-shaped bodies 102 to the center point P of the taper angle α, and $L_5$ represents the distance from the bottom of the member 10 to the center point P. In this case, the members 10 of the present invention can be aligned in a circular arc of a circle with center P and radius $L_5$ such that the tips of the needle-shaped bodies 102 point towards the center point P (FIG. 5B, which will be described later in detail). Thus, if the taper angle α is, for example, 10°, 36 pieces of members 10 can be aligned.

Figure 4:
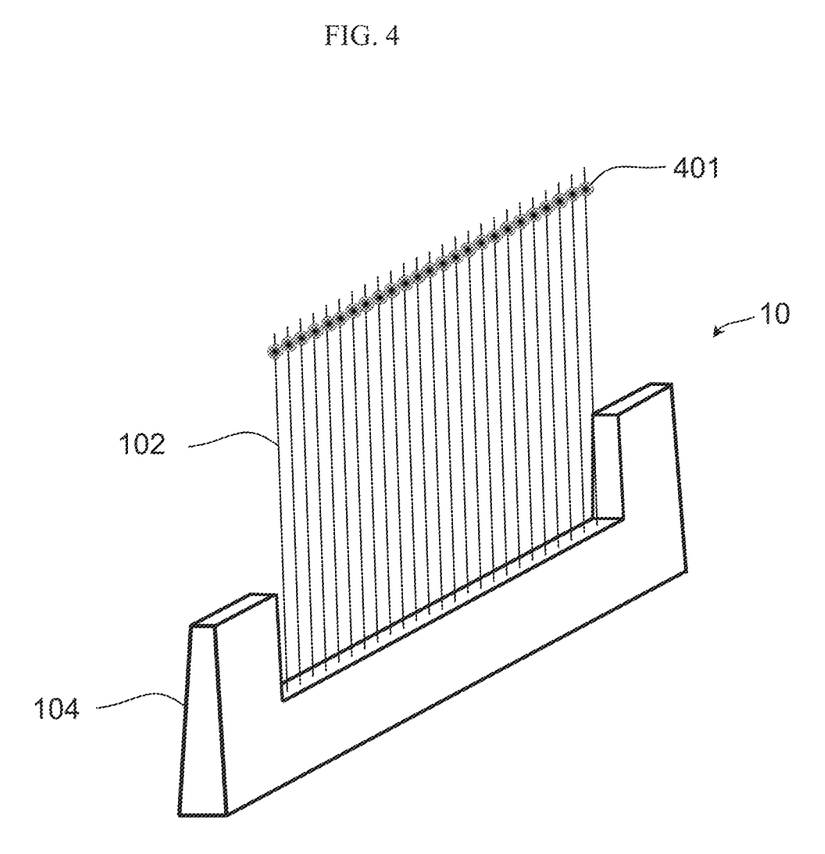
FIG. 4 is a view showing a jig member for fabricating a luminal cell structure, where spheroids are aligned in a line on the tips of the needle-shaped bodies.

FIG. 4 is a view showing an aspect where cell masses (spheroids) 401, i.e., cell aggregates, are disposed on the areas at the tips of the needle-shaped bodies 102 of the member 10 of the present invention, along the length of the member 10. One or a plurality of spheroids 401 may be disposed per one needle-shaped body so that, when the members 10 are aligned in a circular arc as shown in FIG. 5B, the spheroids form a single layer (i.e., so that the surface layer of the luminal cell structure is formed of a single layer) or multiple layers, respectively.

Herein, to "dispose" the spheroids 401 on the needle-shaped bodies 102 means that the spheroids 401 are brought into contact with the needle-shaped bodies 102 such that the spheroids 401 can fuse with each other, either by an aspect where the spheroids 401 are skewered on the needle-shaped bodies 102 or by an aspect where the spheroids 401 are disposed between adjacent needle-shaped bodies 102 to allow spontaneous aggregation. If the space between the adjacent needle-shaped bodies is generally equal to or smaller than the diameter of the spheroids 401, for example, the needle-shaped bodies 102 (i.e., the member 10) can be placed horizontally and the spheroids 401 can be placed thereon so that the spheroids 401 can spontaneously aggregate to form a row of linear structure like a piece of thread without skewering the spheroids 401 on the needle-shaped bodies 102.

Here, for convenience of explanation, FIG. 4 shows an aspect where the spheroids 401 are skewered on the needle-shaped bodies 102.

Since the number of spheroids 401 disposed in the longitudinal direction of each needle-shaped body 102 reflects the thickness of the luminal cell structure, the number of cell aggregates (spheroids) 401 to be disposed can suitably be determined in accordance with the luminal cell structure of interest. Moreover, the distance from the needle-shaped body 102 at one end to the needle-shaped body 102 at the other end reflects the length of the luminal cell structure. Thus, the number of the needle-shaped bodies on which the spheroids 401 are to be disposed can suitably be determined according to the length of the luminal cell structure of interest. The distance from the needle-shaped body 102 at one end to the needle-shaped body 102 at the other end is not particularly limited, and may be, for example, 0.5 cm-30 cm (e.g., 0.5 cm, 1 cm, 2 cm, 3 cm, 5 cm, 10 cm, 15 cm, 20 cm, etc.). Furthermore, the distance between one needle-shaped body and its adjacent needle-shaped body is also not limited, and may be 0.1 mm-2 mm.

Figure 5:
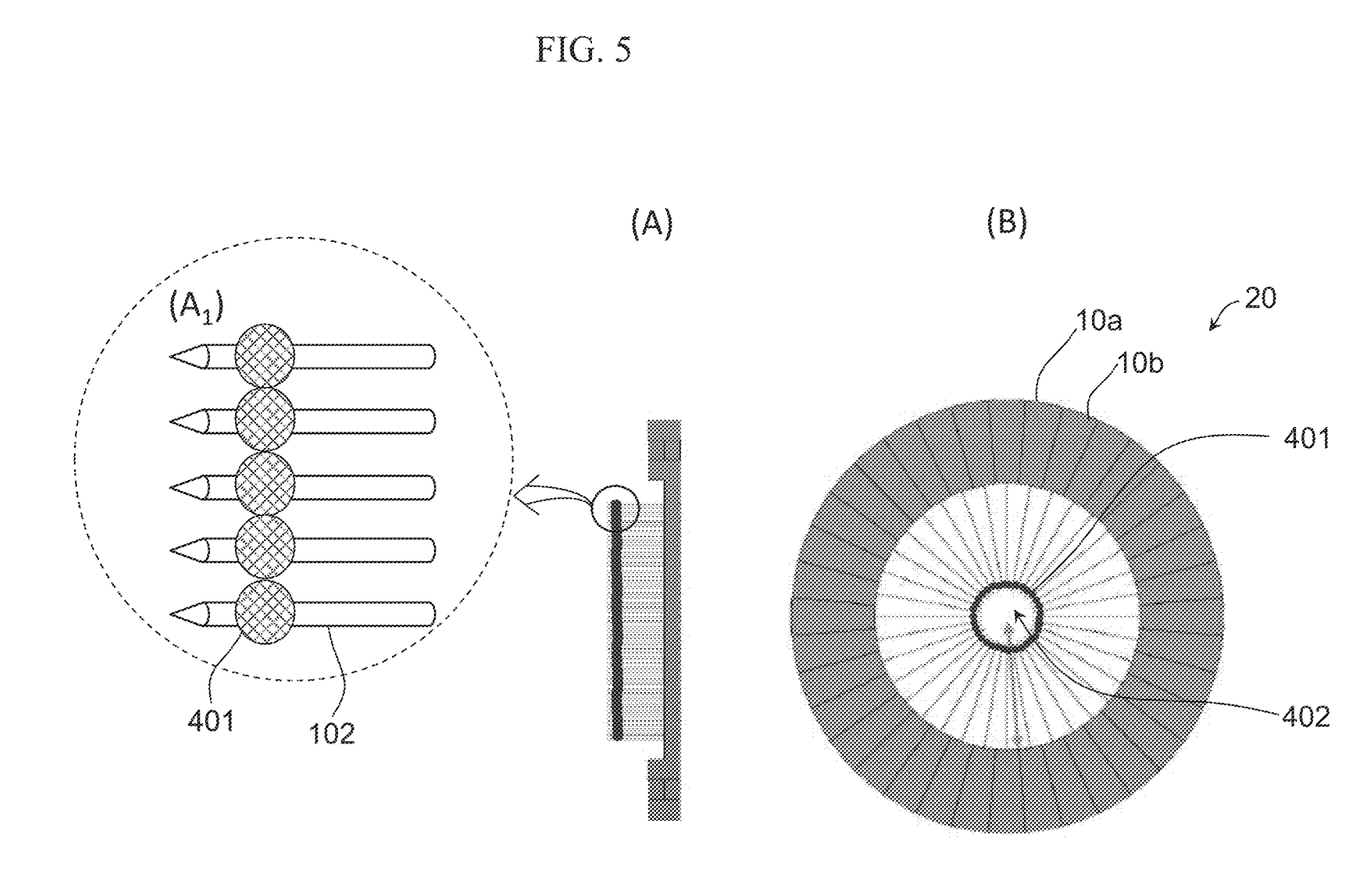
FIG. 5 is a view showing that the jig members for fabricating a luminal cell structure each having spheroids aligned in a line on the tips of the needle-shaped bodies are aligned such that the tips of the needle-shaped bodies point towards the center of the circle.
Figure 6:
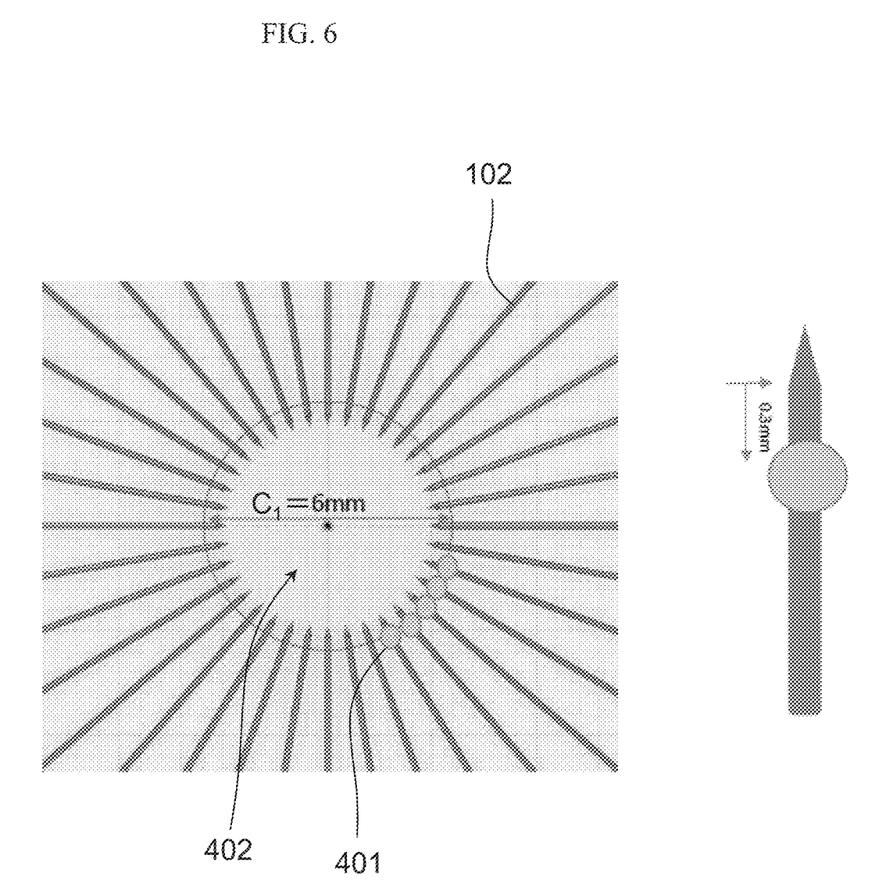
FIG. 6 is a view showing that the tips of the needle-shaped bodies are aligned to point towards the center of the circle.

FIG. 5 shows that the members 10 each having the spheroids 401 skewered on the tips of the needle-shaped bodies 102 as shown in FIG. 4 are aligned such that the tips of the needle-shaped bodies 102 point towards the center point (P in FIG. 3) of the circle (a polygon to be precise but herein assumed as a circle; the same applies hereafter), and FIG. 6 is an enlarged view of the tips of the needle-shaped bodies 102 after aligning the members 10 (where only some of the spheroids 401 are shown).

FIG. 5A shows that the spheroids 401 are skewered on the needle-shaped bodies 102 to give a single layer, and $A_1$ is a partially enlarged view. FIG. 5 again shows the aspect in which the spheroids 401 are skewered on the needle-shaped bodies 102. Here, the position at the tip of the needle-shaped body 102 where the spheroid 401 is to be skewered may be anywhere as long as the tip of the needle-shaped body 102 penetrates through the spheroid 401, and thus the edge of the spheroid 401 does not have to be at the same level as the tip of the needle-shaped body 102. For example, as shown in FIG. 5A or $A_1$, the spheroid 401 can be skewered on a position slightly deeper than the tip of the needle-shaped body 102.

FIG. 5B shows a jig 20 for fabricating a luminal cell structure where 36 pieces of members 10 are aligned in a circular arc such that their surfaces 103 extending in the longitudinal direction face each other and the tips of the needle-shaped bodies 102 point towards the center of the circle. Specifically, the jig 20 for fabricating a luminal cell structure has members aligned such that the tips of the needles point towards the center point P of a circle having radius $L_5$ as shown FIG. 3.

As can be appreciated from FIG. 5B, when the members 10 are aligned in a circular arc such that the surfaces 103 extending in the longitudinal direction of the members 10 face each other and the tips of the needle-shaped bodies point towards the center of the circle, for example, the spheroid skewered on one member 10a fuses with the spheroid skewered on the adjacent member 10b, and form a ring shape as a whole. The length corresponding to the number of the needle-shaped bodies 102 having the spheroids 401 skewered thereon becomes the length of the luminal structure (FIG. 4, FIG. 5A and the like.)

Furthermore, in FIG. 3, distance $L_4$ from the center point P to the tip of the needle-shaped body 102 becomes the radius of the circle circumscribed by the tips of the needle-shaped bodies 102. Accordingly, the distance from the spheroid 401 to the center point P becomes the radius of the lumen of the luminal structure. For example, as shown in the right panel in FIG. 6, when the spheroid 401 is skewered on the needle-shaped body 102 slightly deeper from the tip (in the figure, the spheroid 401 is inserted into the needle-shaped body to a depth of 0.3 mm from the root of the pointed end), the diameter of the lumen of the fabricated luminal cell structure can be represented by [(sum of $L_4$ shown in FIG. 3C and the inserted distance)×2]. The left panel in FIG. 6 shows that the diameter $C_1$ is 6 mm provided that the circumference is the line obtained by connecting the centers of the spheroids.

Once the spheroids are fused with each other, the members 10 can be pulled out, thereby obtaining a luminal cell structure with a predetermined length and a predetermined lumen diameter.

Figure 7:
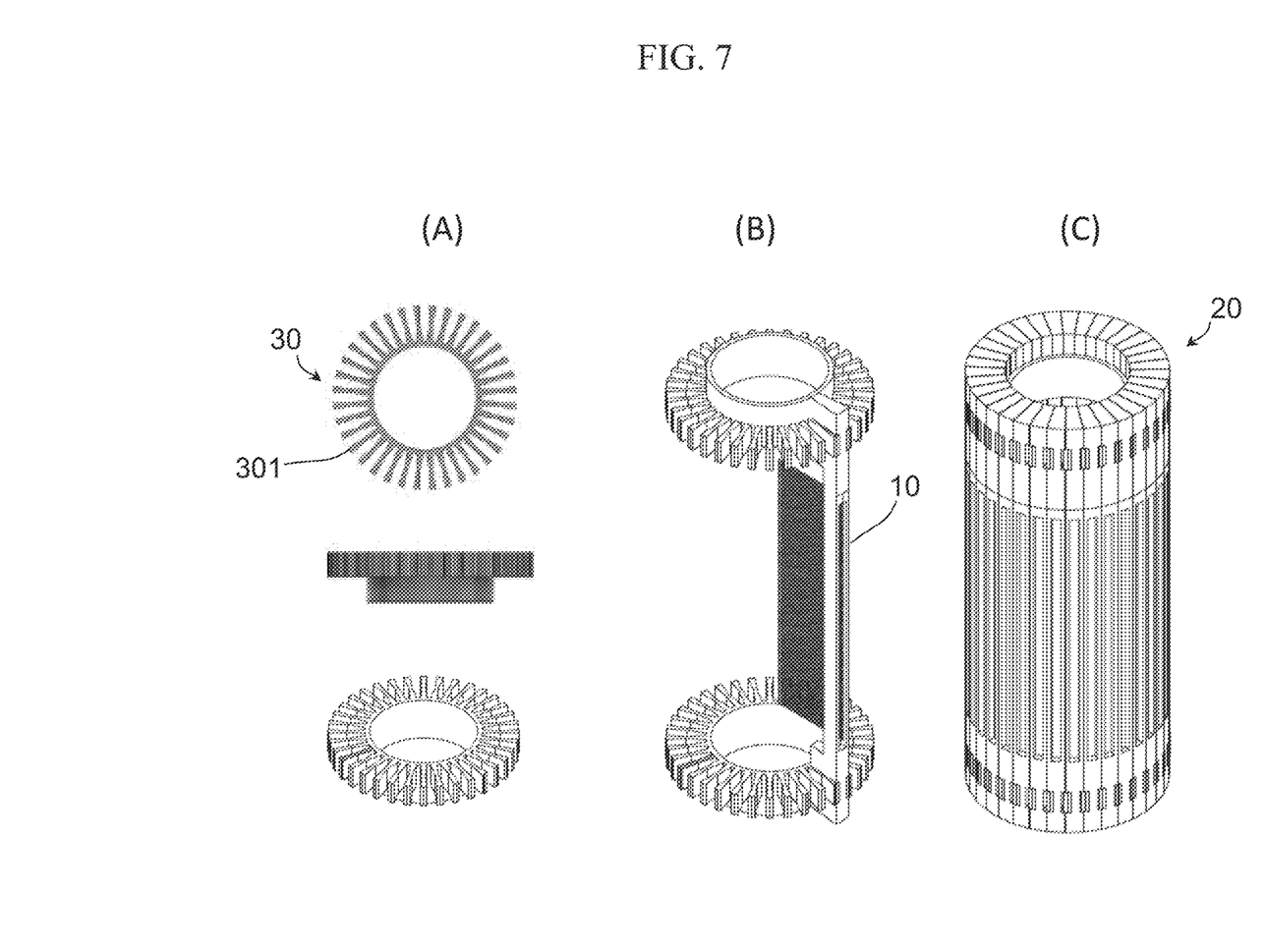
FIG. 7 is a view showing a jig for fabricating a luminal cell structure of the present invention.

FIG. 7 shows a jig 20 for fabricating a luminal cell structure (hereinafter, referred to as a "jig 20") obtained by aligning the members 10 of the present invention.

In one aspect of the present invention, a holder 30 for holding both end areas of the member 10 can be used to align the members 10 of the present invention. FIG. 7A shows flap-like protruding parts 301 for slotting and fitting the members 10 therebetween. The protruding parts 301 are each slightly thick on the root side and the inlet side and thin in the center part and together form a gear wheel-like elastic member (made of, for example, polyethylene, polystyrene or the like). Once the end parts 104 at both ends of the member 10 is fit into a space between one protruding part and its adjacent protruding part of the holder 30 (FIG. 7B), the member 10 is secured by the holder 30. FIG. 7B shows a state where one piece of member 10 has been slid and fit into the holder 30. Once all pieces of members 10 are fit in a circular arc manner (in other words, the members 10 are fit so that the taper angle α in FIG. 3 becomes 360°), a generally cylindrical jig 20 for fabricating a luminal cell structure is obtained (FIG. 7C).

According to the present invention, the members 10 having the spheroids skewered thereon can be automatically fit into the holder 301.

Figure 8:
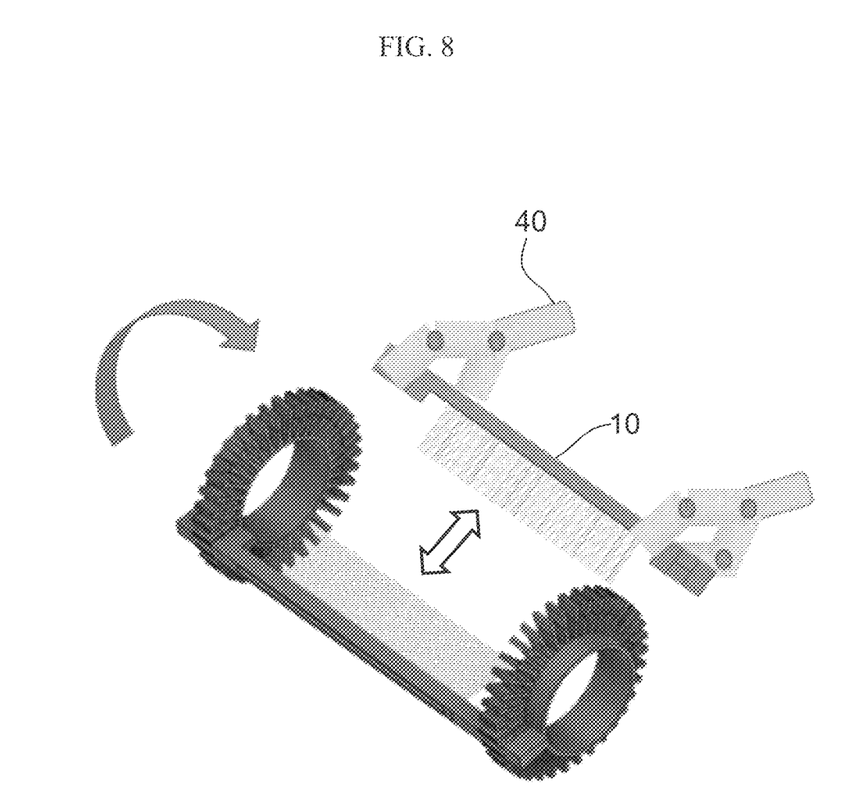
FIG. 8 is a view showing that the jig member for fabricating a luminal cell structure is set mechanically.

For example, FIG. 8 shows that automatic robot arms 40 are used to grasp and fit the member 10 into the holders 301 or pull the member 10 out from the holders 301.

Figure 9:
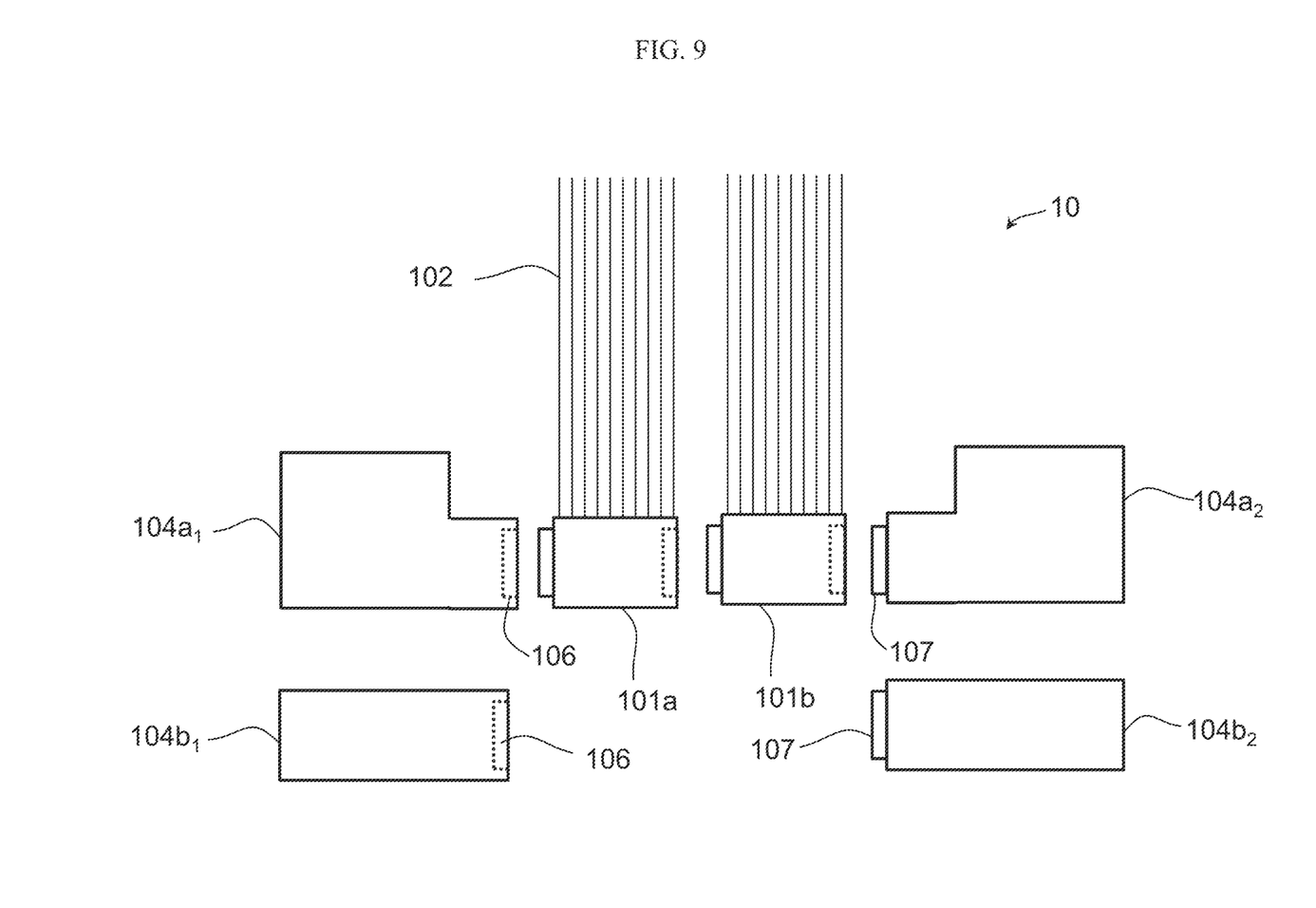
FIG. 9 is a view showing a modular jig member for fabricating a luminal cell structure.

Moreover, in one aspect of the present invention, the member 10 can be a modular member which can be separated into a plurality of components. FIG. 9 shows an aspect of a modular member where the member 10 is made up of four components. In the member 10, parts provided with the needle-shaped bodies 102 and the end parts 104 at both ends without the needle-shaped bodies can be used as components to form a member 10 with a predetermined length. End parts $104a_1$ and $104a_2$ are used for an aspect that has protruding areas extending in the longitudinal direction of the needles whereas end parts $104b_1$ and $104b_2$ are used for an aspect without such protruding areas. The end parts 104 are provided with a convex part 107 or a concave part 106 in the connecting direction (the longitudinal direction of the member 10). The parts 101a and 101b, i.e., components provided with the needle-shaped bodies 102, are also provided with a convex part 107 and a concave part 106. The concave parts and the convex parts are shaped to engage with each other. Thus, a plurality of parts, i.e., the part 101a, the part 101b, the part 101c (not shown) and so on, as the components can suitably be engaged and connected to adjust the length of the member 10, thereby suitably adjusting the length of the fabricated luminal cell structure. The shapes of the convex part and the concave part are not particularly limited as long as the components can be connected with each other, and they may have an angular or round shape.

According to the present invention, after the spheroids 401 are disposed on the tip areas of the needle-shaped bodies 102 of the member 10 (FIG. 4), the members 10 that have the spheroids 401 disposed thereon are aligned in a circular arc such that their surfaces 103 extending in the longitudinal direction face each other and the tips of the needle-shaped bodies 102 point towards the center of the circle as shown in FIG. 5, and then the spheroids 401 are cultured, thereby fabricating a luminal cell structure.

The kind of cells used in the present invention is not particularly limited, and any kind of cells that can form spheroids can be used. Examples of the cells that can form spheroids include undifferentiated cells such as stem cells (ES cells, umbilical cord blood-derived cells, undifferentiated mesenchymal stem cells, adult mesenchymal stem cell, etc.) and differentiated cells thereof. Examples of tissues as sources of these cells include articular cartilage, bone, fat tissue, ligament, tendon, teeth, auricle, nose, liver, pancreas, blood vessels, nerves and heart. Among others, hepatocytes, cardiomyocytes or the like are preferable. Moreover, spheroids that are formed are not necessarily aggregates of one kind of cells and they can be formed of multiple kinds of cells as long as spheroids are formed.

In addition, the culture time for forming the cell structure is generally 3-21 days under general culture conditions (for example, 37° C., 5% $CO_2$ atmosphere).

The cell structure formed as described above can have a seamless luminal form in which the spheroids are fused without a joint.

EXAMPLES

Hereinafter, the present invention will be described in more detail by means of examples. The scope of the present invention, however, should not be limited to these examples.

Example 1

Figure 10:
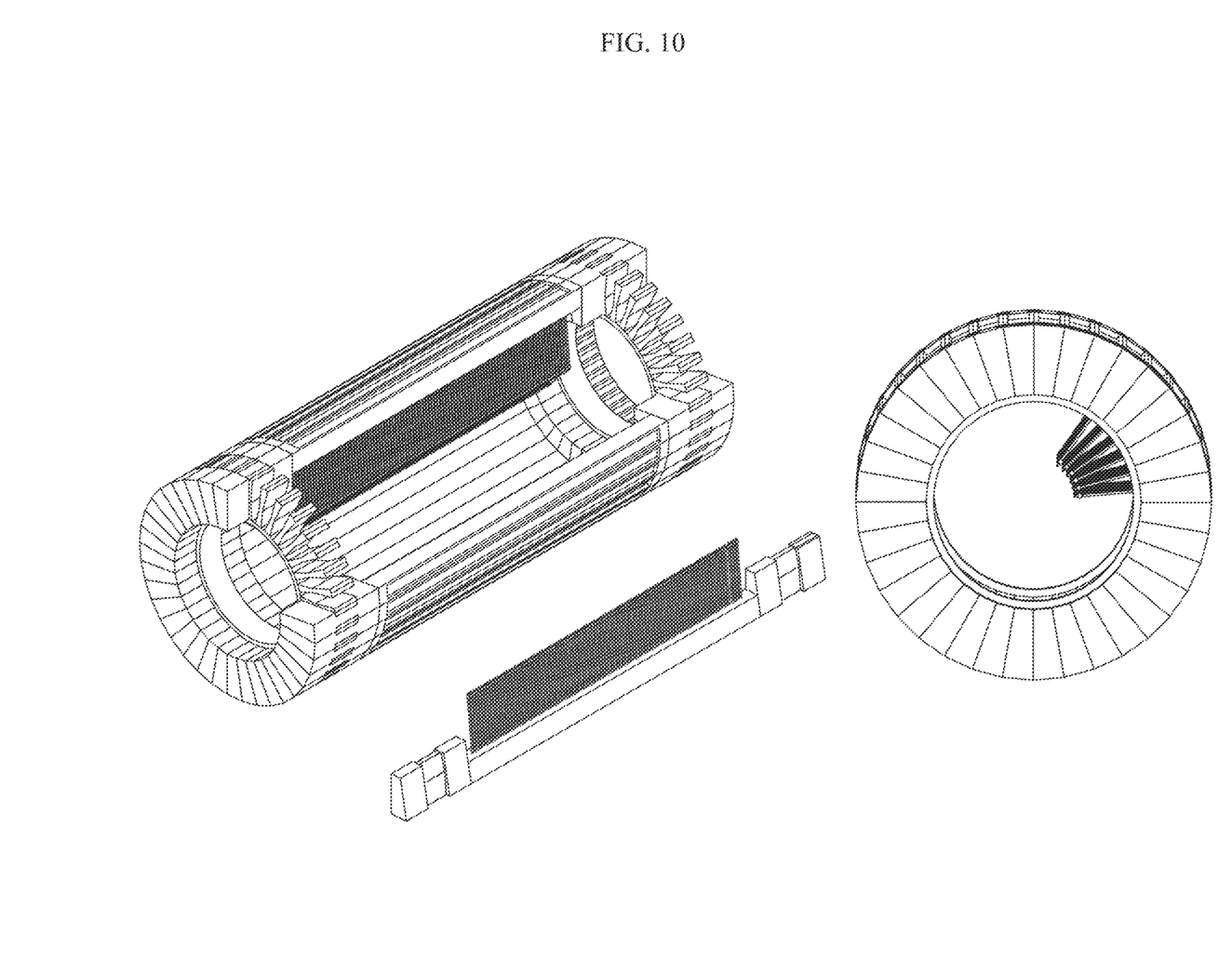
FIG. 10 is a view showing a jig member for fabricating a luminal cell structure manufactured according to an example.
Figure 11:
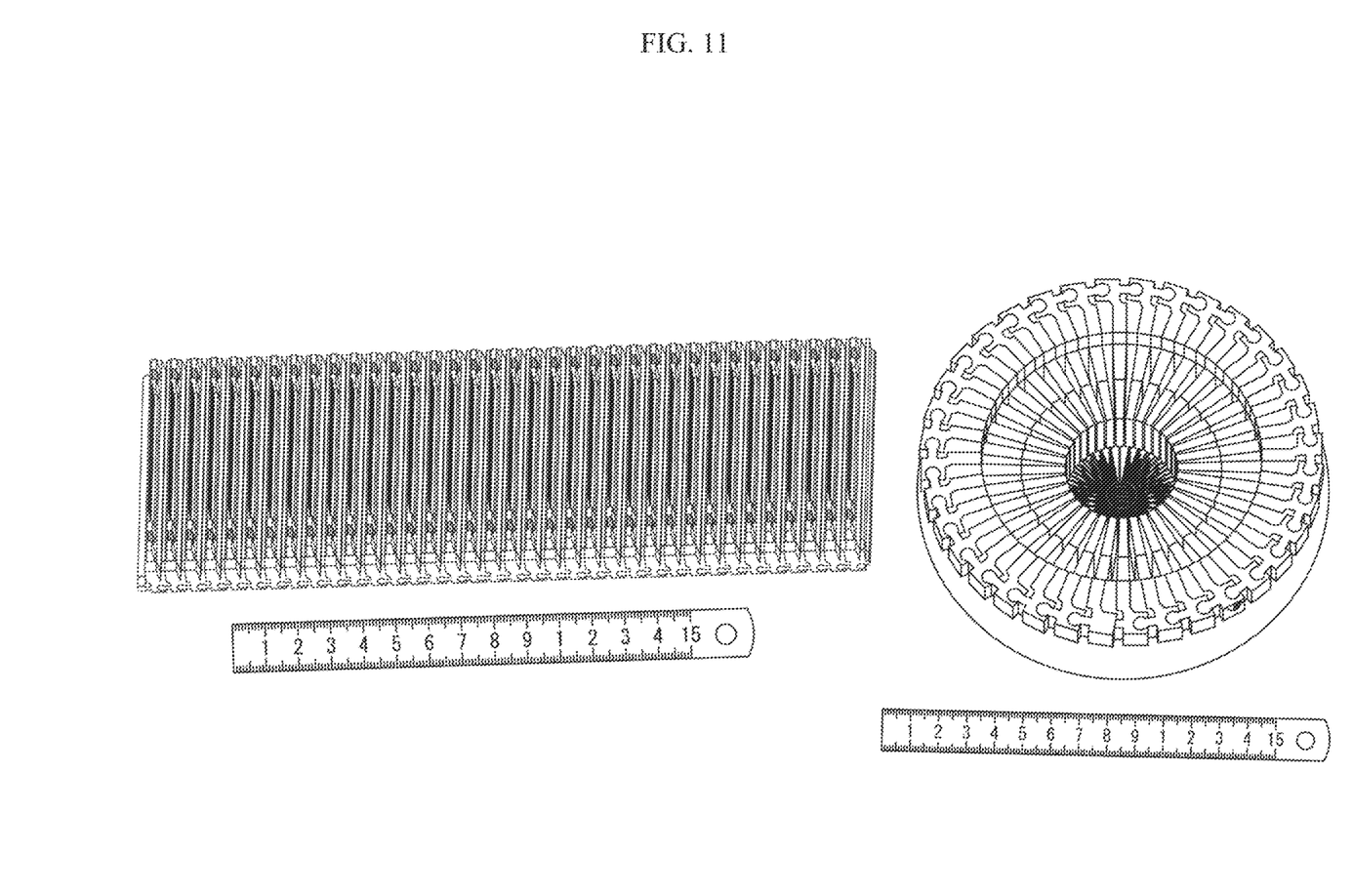
FIG. 11 is a view showing the jig member for fabricating a luminal cell structure manufactured according to the example.

FIGS. 10 and 11 show a prototype of a jig 40 for fabricating a luminal cell structure of the present invention.

A resin such as polycarbonate was finely processed by CNC processing so that 5 cm-long stainless-steel needles were held at intervals of 0.4 mm. This prototype was made to form a circle with 36 pieces of jig members.

Example 2

The jig produced in Example 1 was used to dispose spheroids on needle-shaped bodies, and 36 pieces of these jig members were aligned to fabricate a luminal cell structure. The spheroids were prepared by culturing commercially available dermal fibroblasts for 10 days, and the spheroids obtained were disposed on the jigs as described above. Hundred spheroids were used per one set of needle-shaped bodies. Thirty-six pieces of these jig members were aligned and subjected to culture at 37° C. in a 5% $CO_2$ atmosphere for 7 days to allow the spheroids disposed on the needle-shaped bodies to fuse with each other (FIGS. 12 and 13).

Figure 12:
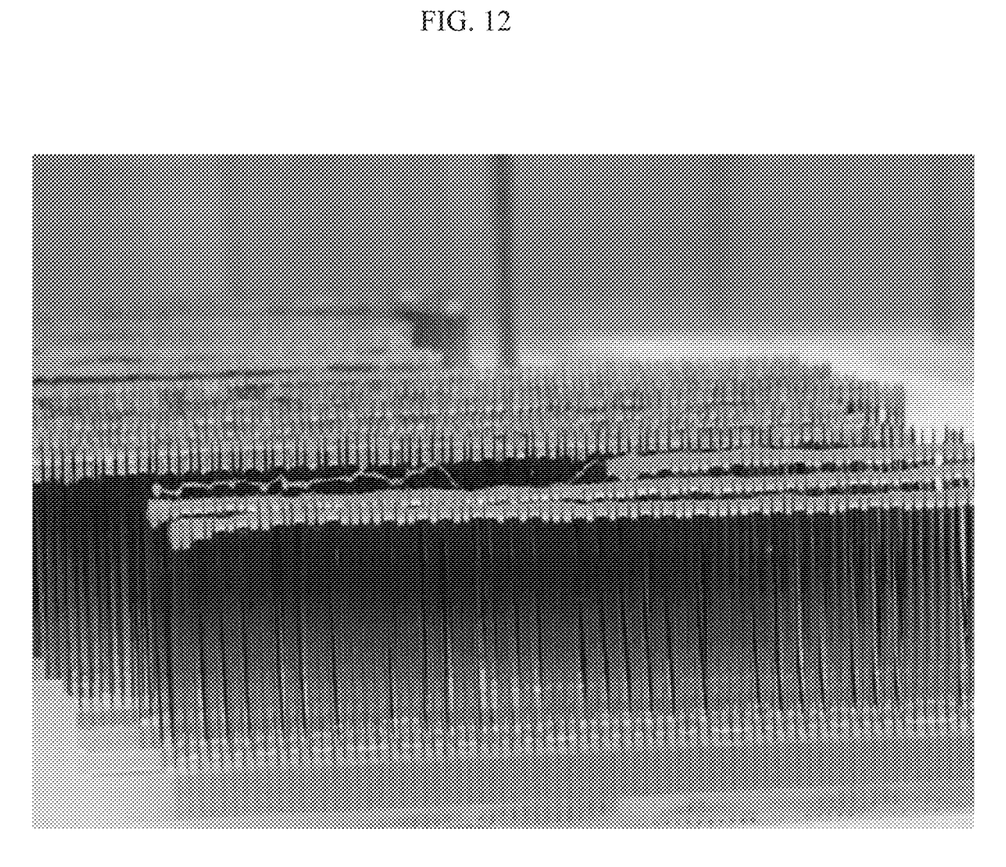
FIG. 12 is a view showing that spheroids are aligned in a line on the tips of the needle-shaped bodies of each jig member for fabricating a luminal cell structure.
Figure 13:
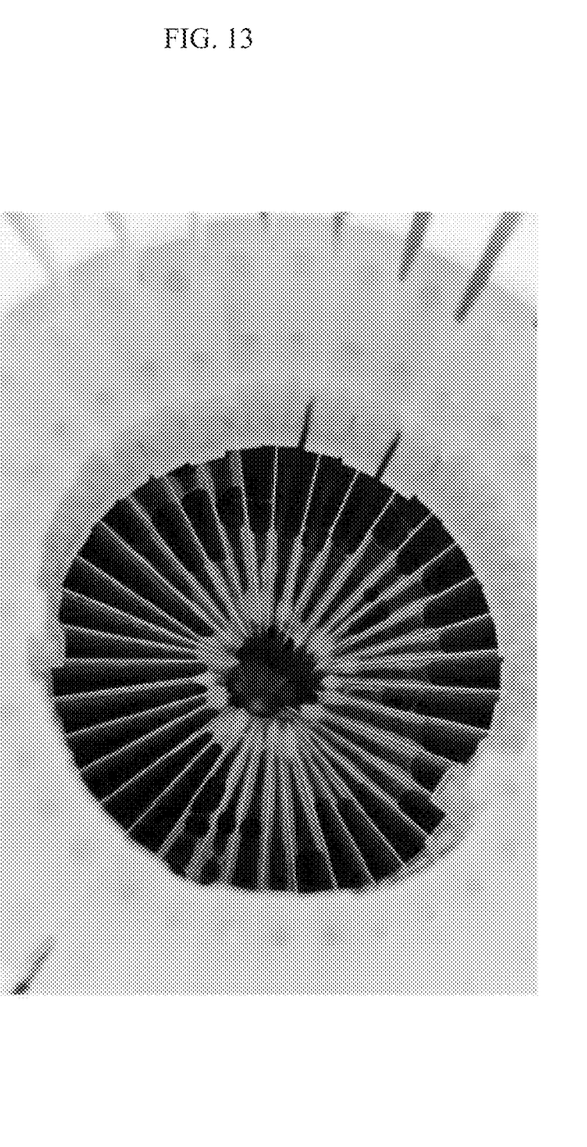
FIG. 13 is a view showing that the jig members shown in FIG. 12 are aligned towards the center of the circle.

FIG. 12 is a picture showing that spheroids were disposed in a line on the tips of the needle-shaped bodies of each jig member for fabricating a luminal cell structure, FIG. 13 shows the center of the circle obtained when the jig members shown in FIG. 12 were aligned toward said center. The spheroids fused with each other and formed a columnar structure.

Figure 14:
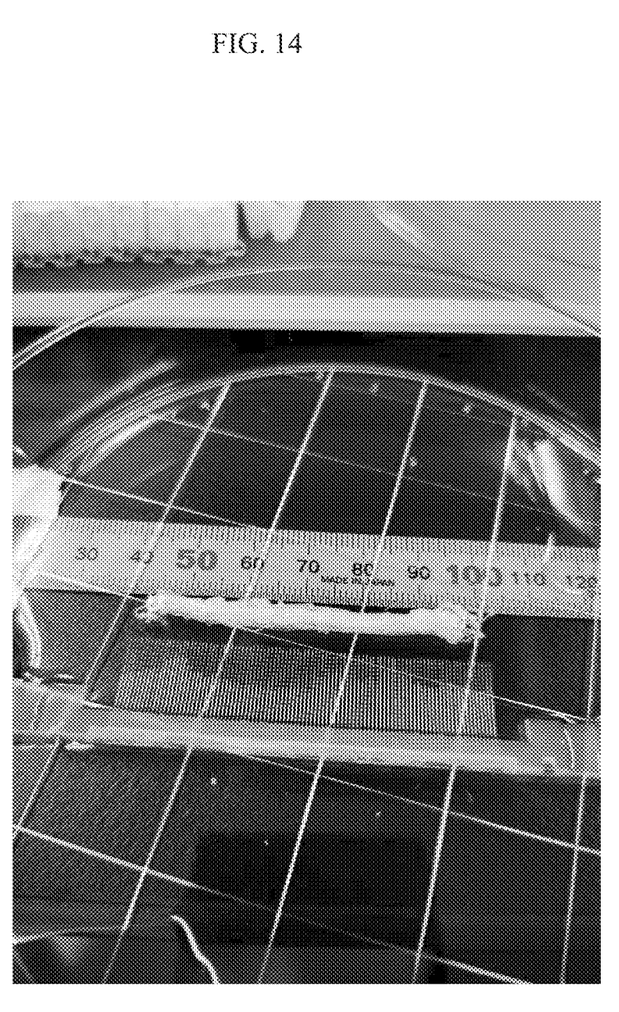
FIG. 14 is a view showing a luminal cell structure fabricated using the jig for fabricating a luminal cell structure of the present invention.

FIG. 14 shows the finally obtained luminal cell structure after removing the jig members.

As shown in FIG. 14, the fabricated luminal cell structure had a length corresponding to the distance from one end to the other end of the needle-shaped bodies provided in the longitudinal direction of the members 101, and in addition, the structure had no joint.

DESCRIPTION OF REFERENCE NUMERALS

10: Jig member for fabricating luminal cell structure
20: Jig for fabricating luminal cell structure
30: Holder
40: Arm
101: Support
102: Needle-shaped bodies
103: Surface in the longitudinal direction
104: End parts
105: Surface in the thickness direction
301: Protruding parts
401: Spheroids

The invention claimed is:

1. A jig for fabricating a luminal cell structure, comprising:
a plurality of jig members, each of the jig member comprising a plate-shaped support and a comb-shaped member having needle-shaped bodies, wherein the plate-shaped support has an upper surface, a bottom surface, and side surfaces extending in a longitudinal direction, the side surfaces abutting the upper surface in a thickness direction are tapered from the bottom surface to the upper surface,
the comb-shaped member is disposed on the upper surface of the plate-shaped support so that the needle-shaped bodies are aligned in the longitudinal direction of the plate-shaped support and the needle-shaped bodies extends in a thickness direction of the plate-shaped support, and
the plurality of jig members are aligned in a circular arc such that the side surfaces of the plate-shaped support face each other and tips of the needle-shaped bodies point towards a center of the circular arc.

2. A jig for fabricating a luminal cell structure, comprising:
a plurality of jig members, each of the jig member comprising a plate-shaped support and a comb-shaped member having needle-shaped bodies; and
a holder for holding the plurality of jig members, wherein the plate-shaped support has an upper surface, a bottom surface, and side surfaces extending in a longitudinal direction, the side surfaces abutting the upper surface in a thickness direction are tapered from the bottom surface to the upper surface,
the comb-shaped member is disposed on the upper surface of the plate-shaped support so that the needle-shaped bodies are aligned in the longitudinal direction of the plate-shaped support and the needle-shaped bodies extends in a thickness direction of the plate-shaped support,
the plurality of jig members are aligned in a circular arc such that the side surfaces of the plate-shaped support face each other and tips of the needle-shaped bodies point towards a center of the circular arc, and
the plate-shaped support of each of the plurality of jig members is held by the holder so that the plurality of jig members are aligned in the circular arc.

3. The member according to claim 2, wherein each of the plate-shaped supports has protrusions at both ends, each of the protrusions protruding in a length direction of the needle-shaped bodies, wherein the protrusions are held by the holder so that the plurality of jig members are aligned in the circular arc.

4. A method for fabricating a luminal cell structure, the method comprising:
   disposing spheroids on tip areas of the needle-shaped bodies of the jig according to claim 1;
   and
   culturing the spheroids.

5. A method for fabricating a luminal cell structure, the method comprising:
   disposing spheroids on tip areas of the needle-shaped bodies of the jig according to claim 2; and
   culturing the spheroids.

* * * * *